(12) United States Patent
Gibson et al.

(10) Patent No.: US 7,838,817 B2
(45) Date of Patent: *Nov. 23, 2010

(54) SYSTEM FOR DETERMINING AN OPERATIONAL STATE OF A MEMS BASED DISPLAY

(75) Inventors: Gregory T. Gibson, Snohomish, WA (US); Richard A. James, Woodinville, WA (US); Wyatt O. Davis, Bothell, WA (US)

(73) Assignee: Microvision, Inc., Redmond, WA (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/437,124

(22) Filed: May 7, 2009

(65) Prior Publication Data

US 2009/0212203 A1  Aug. 27, 2009

Related U.S. Application Data

(63) Continuation of application No. 11/796,531, filed on Apr. 26, 2007, now Pat. No. 7,550,713.

(51) Int. Cl.
*H01J 3/14* (2006.01)
(52) U.S. Cl. .................................. 250/234; 250/208.1
(58) Field of Classification Search ......... 250/234–236, 250/208.1, 216, 205; 359/198–214, 223–225; 356/373–375
See application file for complete search history.

(56) References Cited

U.S. PATENT DOCUMENTS

| 4,000,397 | A | 12/1976 | Hebert et al. |
|---|---|---|---|
| 4,020,357 | A | 4/1977 | Punis |
| 4,091,379 | A | 5/1978 | Wu et al. |
| 4,158,435 | A | 6/1979 | Nakanishi et al. |
| 4,335,301 | A | 6/1982 | Palmer et al. |
| 4,528,444 | A | 7/1985 | Hara et al. |
| 4,740,675 | A | 4/1988 | Brosnan et al. |
| 4,749,879 | A | 6/1988 | Peterson et al. |
| 4,777,357 | A | 10/1988 | Harada et al. |
| 4,782,219 | A | 11/1988 | Crater |
| 4,798,943 | A | 1/1989 | Cherry |
| 4,933,538 | A | 6/1990 | Heiman et al. |
| 5,272,323 | A | 12/1993 | Martino |
| 5,302,813 | A | 4/1994 | Goren |
| 5,408,081 | A | 4/1995 | Barkan |
| 5,436,440 | A | 7/1995 | Barkan |
| 5,446,272 | A | 8/1995 | Barkan |
| 5,449,893 | A | 9/1995 | Bridgelall et al. |
| 5,463,211 | A | 10/1995 | Arends et al. |
| 5,475,208 | A | 12/1995 | Marom |
| 5,545,888 | A | 8/1996 | Barkan et al. |
| 5,557,094 | A | 9/1996 | Barkan |
| 5,581,072 | A | 12/1996 | Bridgelall et al. |
| 5,606,447 | A | 2/1997 | Asada et al. |

(Continued)

*Primary Examiner*—Que T Le
(74) *Attorney, Agent, or Firm*—Kevin D. Wills (57) ABSTRACT

Briefly, in accordance with one or more embodiments, an operational state of a MEMS device of a scanner system may be determined. In the event it is determined that the MEMS device is possibly operating in an unsafe mode, the laser may be turned off and/or the MEMS device may be shut down. An operational state of the MEMS device may be determined for example by obtaining a MEMS drive voltage sense signal and/or a MEMS drive current sense signal, and a potentially unsafe mode of operation may be identified if one or more of such signals are not at proper values with respect to predetermined threshold values.

20 Claims, 9 Drawing Sheets

U.S. PATENT DOCUMENTS

| | | |
|---|---|---|
| 5,612,531 A | 3/1997 | Barkan |
| 5,705,799 A | 1/1998 | Li |
| 5,811,782 A | 9/1998 | Sato et al. |
| 5,852,286 A | 12/1998 | Coleman |
| 5,923,023 A | 7/1999 | Arends et al. |
| 5,925,868 A | 7/1999 | Arends et al. |
| 5,949,054 A | 9/1999 | Karpen et al. |
| 5,990,473 A | 11/1999 | Dickey et al. |
| 6,000,616 A | 12/1999 | Spitz |
| 6,073,849 A | 6/2000 | Colley et al. |
| 6,155,490 A | 12/2000 | Ackley |
| 6,189,794 B1 | 2/2001 | Iwaguchi et al. |
| 6,343,741 B1 | 2/2002 | Arends et al. |
| 6,382,511 B1 | 5/2002 | Tang et al. |
| 6,388,789 B1 | 5/2002 | Bernstein |
| 6,502,751 B1 | 1/2003 | Tang |
| 6,874,688 B1 | 4/2005 | Barkan |
| 6,938,824 B2 | 9/2005 | Madej et al. |
| 7,123,399 B2 * | 10/2006 | Gudeman et al. ........... 359/290 |
| 7,221,247 B2 | 5/2007 | Levitan et al. |
| 7,550,713 B2 * | 6/2009 | Gibson et al. ............... 250/234 |
| 2006/0108425 A1 | 5/2006 | Wiklof |
| 2006/0132883 A1 | 6/2006 | Saitoh |
| 2007/0296532 A1 | 12/2007 | Ko et al. |

\* cited by examiner

SYSTEM FOR DETERMINING AN OPERATIONAL STATE OF A MEMS BASED DISPLAY

CLAIM OF PRIORITY

This application is a continuation of U.S. patent application Ser. No. 11/796,531, filed on Apr. 26, 2007.

BACKGROUND

A scanner system having a microelectromechanical system (MEMS) device to provide a scanned laser beam needs to maintain a safe level of laser light emissions, for example to be in compliance with safety regulations. In order to utilize a maximum laser light output during operation, it is important to determine if the scanning mechanism has inadvertently stopped and is no longer scanning but emitting laser light at a fixed location so the laser light may be powered down or disabled if such an event occurs. Typically, separate, dedicated motion sensor such as piezoresistive strain sensors disposed on the MEMS device or Hall effect sensors have been utilized to detect the operational state of the MEMS device. Such separate, dedicated sensors may add cost and complexity to the MEMS device.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
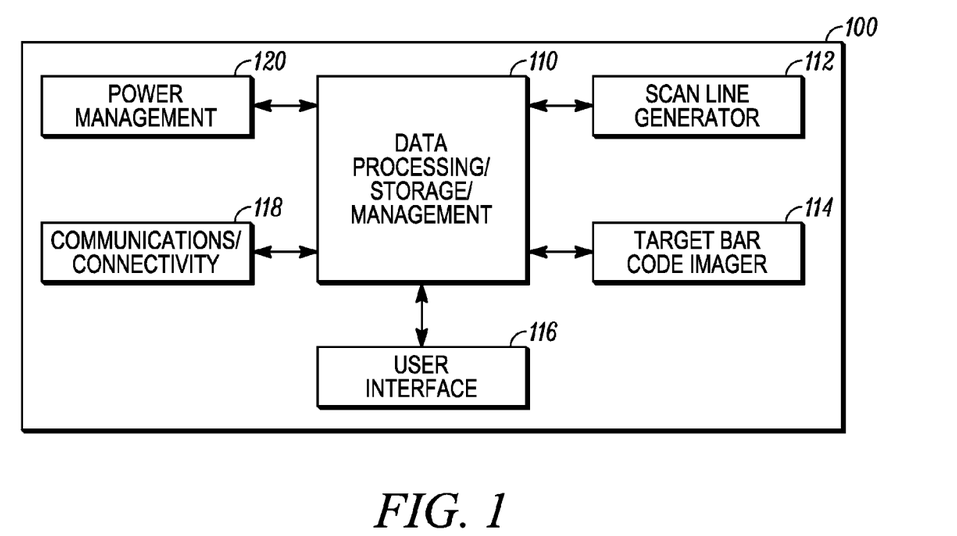
FIG. 1 is a block diagram of a scanner system in accordance with one or more embodiments.

Referring now to FIG. 1, a block diagram of a scanner system in accordance with one or more embodiments will be discussed. As shown in FIG. 1, scanner system 100 may comprise a data processing, storage, and management block (DATA PROCESSING/STORAGE/MANAGEMENT) 110. In general, the data processing, storage, and management block may be referred to as processor 110. Processor 110 may send control signals to scan line generator (SCAN LINE GENERATOR) block 112 to cause scan line generator 112 to generate a laser beam swept across a target such as a bar code in a generally linear sweep across the target. In one or more embodiments, scan line generator 112 may generate a linear sweep scan line in one dimension, for example to read a one-dimensional type bar code, and in one or more alternative embodiments, scan line generator 112 may generate a non-linear sweep scan, and/or or a scan along two scan lines that may be orthogonal to one another, and/or non-orthogonal in some embodiments, for example to read a two-dimensional type bar code or other code or symbol, although the scope of the claimed subject matter is not limited in these respects. In general, a sweep scan may also refer to a sweep range or a scan angle.

Scanner system 100 may comprise a target bar code imager 114 that is capable of capturing light emitted from scan line generator 112 that is reflected off of the target bar code as a reflectance profile of the target to convert the reflectance profile into an electrical signal representative of information stored in the target bar code. Target bar code imager 114 then sends the reflectance profile signal to processor 110 for decoding of the information stored in the target bar code.

In one or more embodiments, scanner system 100 may further include a user interface 116 capable of allowing a user to control scanner system 100. For example, user interface 116 may include one or more buttons or other actuators to cause scan line generator 112 emit the scan line to capture the target bar code. User interface 116 optionally may include devices for indicating to a user that a target bar code was successfully scanned, for example one or more lights, displays, speakers, and so on, and/or to provide other operational information to the user to assist the user in operating scanner system 100.

In addition, scanner system 100 may include a communications/connectivity block 118 that includes circuits for allowing scanner system 100 to connect to one or more other devices, for example to send information obtained from scanned targets to remote devices such as a computer, server, and/or other type of information handling system. Furthermore, communications/connectivity block 118 may provide one or more interfaces capable of allowing scanner system 100 to be utilized in conjunction with such other devices, for example with such another device may comprise a point of sale (POS) terminal that may utilize scanner system 100 to capture target bar codes disposed on goods sold by a user operating the POS terminal. Furthermore, communications/connectivity block 118 may include various interfaces to allow scanner system 100 to be updated with new programs or software to be stored in and/or executed by processor 110. Communications/connectivity block 118 optionally may include one or more wireless communication systems to allow scanner system 100 to communicate with one or more remote devices via a wireless communication link. Such wireless communication links may comprise, for example, an infrared type communication link, a Bluetooth type communication link, an Institute of Electrical and Electronics Engineers (IEEE) 802.11a/b/g/n type communication link, a broadband type communication link such as a Third Generation Partnership Project (3GPP) type cellular communication link or a Wireless Interoperability for Microwave Access (WiMAX) type communication link, and so on, although the scope of the claimed subject matter is not limited in these respects. In addition, scanner system 100 may include a power management block 120 that is capable of controlling and/or managing the operational power utilized by scanner system. For example, power management block 120 may power down scan line generator 112 when target bar codes are not being captured after a predetermined period of time to conserve power such as when scanner system 100 is being powered by a battery.

Figure 2:
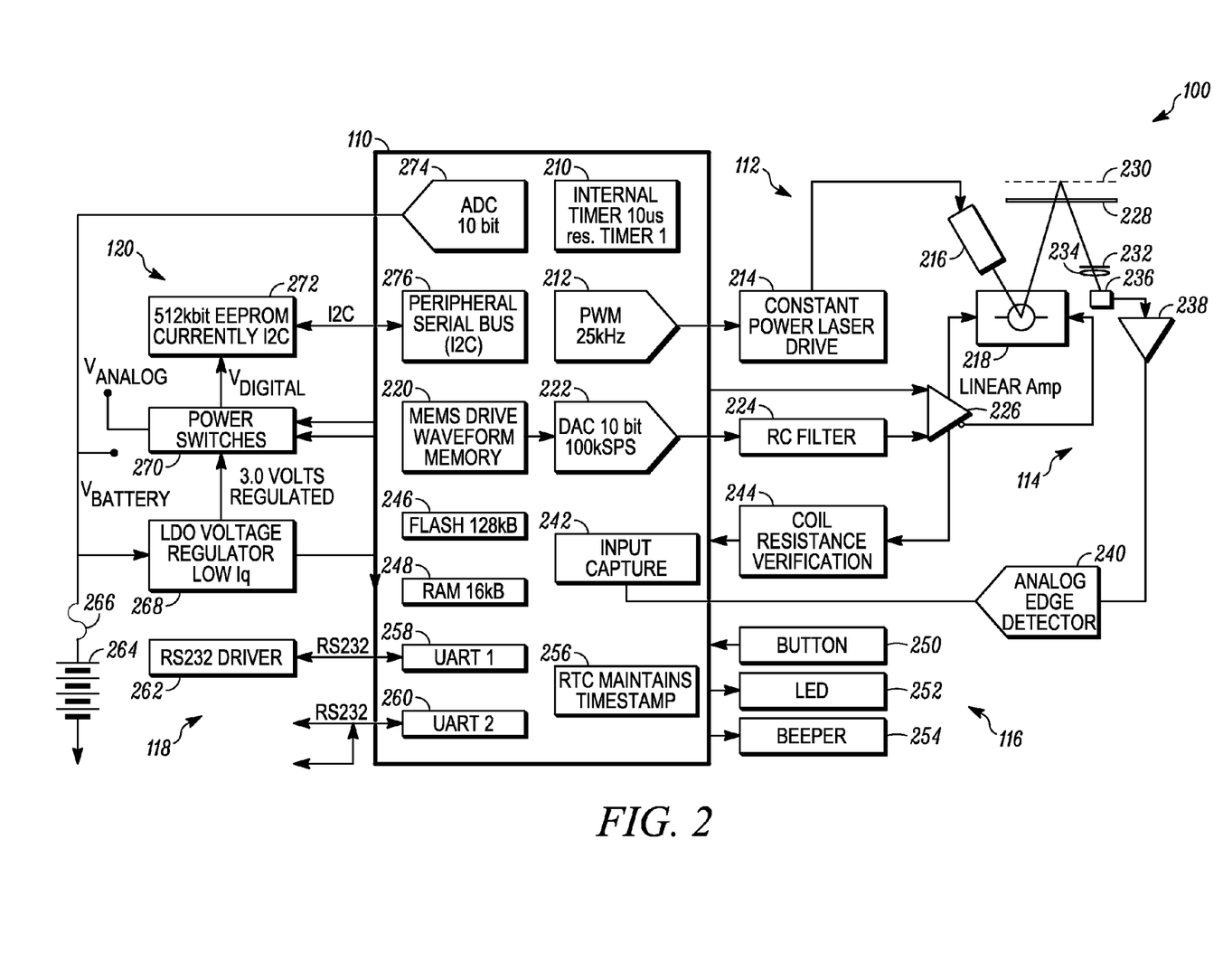
FIG. 2 is a block diagram of a scanner system showing subcomponents of the scanner system in accordance with one or more embodiments.

Referring now to FIG. 2, a block diagram of a scanner system showing subcomponents of the scanner system in accordance with one or more embodiments will be discussed. The diagram shown in FIG. 2 is one particular embodiment of scanner system 100 of FIG. 1. However, other variations of the particular subcomponents of scanner system 100 may be utilized, including more or fewer components, or substitute or alternative components, and the scope of the claimed subject matter is not limited in these respects. As shown in FIG. 2, scanner system 100 generally corresponds to one particular embodiment of scanner system 100 of FIG. 1, including processor 110, scan line generator 112, target bar code imager 114, user interface 116, communications/connectivity block 118, and/or power management block 120. Processor 110 may comprise an internal timer 210 to provide a timing reference for scanner system 100. In one or more embodiments, the period of the timing reference may comprise 10 microseconds, although the scope of the claimed subject matter is not limited in this respect. A pulse width modulator 212 may generate a pulse signal to constant power laser drive 214 to provide a signal for driving laser 216. In response to the driving signal received from constant power laser drive 214, laser 216 may emit a beam of laser light that impinges upon a reflector or mirror of microelectromechanical system (MEMS) device 218. MEMS device 218 is caused to oscillate and/or otherwise move in a desired pattern to cause the reflected laser beam emitted from laser 216 to sweep across a target 230 for capturing and decoding of the target 230. In one or more embodiments, memory 220 may contain values for a waveform with which MEMS device 218 is driven to cause the laser beam to sweep in a desired or predetermined pattern across target 230. The waveform stored in memory 220 may comprise digital values of the waveform for a given period of the waveform that may be converted to an analog signal via digital-to-analog converter (DAC) 222 and filtered with a reconstruction filter 224 to provide a smoother waveform to drive MEMS device 218. In one or more embodiments, the waveform stored in memory 220 may comprise a generally sinusoidal type waveform stored with 10 bits of quantization levels, and DAC 222 may comprise a 10 bit digital-to-analog converter operating at 100 kilosamples per second. Reconstruction filter 224 may comprise a resistor-capacitor type low pass filter capable of removing harmonics from the waveform above the fundamental frequency of the waveform stored in memory 220 to provide a generally smoother waveform to linear amplifier 226 that provides the driving signal to MEMS device 218.

In one or more embodiments, laser light is emitted from laser 216 to onto MEMS device 218 which in turn reflects the laser light onto target 230 in a pattern determined by the waveform stored in memory 222. The laser light is passed through window 228 and reflected off of target 230 back into window 228 of scanner system 100. Window 228 may provide some filtering of ambient light to assist in capturing light reflected off of target 230 without capturing ambient light or other optical noise that may be present in the environment in which scanner system 100 may be operated. Captured light may be further filtered via filter 232 and focused with lens 234 onto an optical detector 236 that may comprise, for example, a positive-intrinsic-negative (PIN) diode or the like. Light impinging on light detector may modulate a current that is amplified by amplifier 238, which may provide preamplification type functions and/or bandpass filter type functions to provide an electrical signal representative of the reflectance profile of light reflected off of target 230 onto optical detector 236. The output of amplifier 238 may then be provided to analog edge detector 240 for detecting edge transitions in electrical signal that correspond, for example, to the edges of bars or other symbols in target code 230. The output of analog edge detector 240 may then be provided to an input capture block 242 of processor 110 for decoding of the signal based on the output of analog edge detector 240. For example, the times between edges detected by analog edge detector 240 may correspond to the widths of the bars in the bar code of target 230, which in turn may correspond to data encoded in the bar code from which the data may be extracted. The resulting decoded signal may be stored, at least temporarily, in a non-volatile memory such as flash memory 246 and/or in a volatile type memory such as random access memory (RAM) 248. Furthermore, programs, software, and/or other data may be stored in flash memory 246 and/or RAM 248. A real time clock (RTC) 256 may be utilized to provide a time reference for processor 110 that may be utilized, for example, to time the interval between pulse edges detected by analog edge detector 240. In one or more embodiments, a coil resistance verification circuit 244 may be utilized to detect whether the coil of MEMS device 218 has failed and is an open circuit or a short circuit, or whether the coil resistance is within a normal range. In the event coil resistance verification circuit 244 detects an open circuit and/or a short circuit in the coil of MEMS device 218, processor 110 may shut off power to laser 216, for example for safety purposes, although the scope of the claimed subject matter is not limited in these respects.

In one or more embodiments, user interface 116 may comprise a button 250 that may be used by a user to actuate scanning of target 230 by scanner system 100. For example, in response to a user actuating button 250, processor 110 may turn on power to laser 216. A light such as light emitting diode (LED) 252 may be used to provide a visual indication to the user that scanner system 100 is operating and attempting to capture a target 230, and/or that the attempted capture of the target has failed and/or has been successful. Furthermore, user interface 116 may include a beeper 254 which may comprise a speaker or other device capable of generating and audible signal, which may likewise indicate to a user that the that scanner system 100 is operating and attempting to capture a target 230, and/or that the attempted capture of the target has failed and/or has been successful. Various combinations of light pulses, light flashed, solid illumination, and/or tones may be utilized to provide combinations of feedback to the user concerning the operation of scanner system 100 and/or the capturing of a target 230 by scanner system 100. Optionally, user interface 116 may include a display capable of providing more advanced and/or more detailed information to the user pertaining to the operation of scanner system 100 and/or the capturing of a target 230 by scanner system 100, although the scope of the claimed subject matter is not limited in this respect.

In one or more embodiments, communications/connectivity block 118 may comprise a first universal asynchronous receiver-transmitter (UART) 258 for handling serial type communications and/or a second UART 260. UART 258 may couple to a recommended standard-232 (RS-232) driver 262 to couple scanner system 100 to remote devices via an RS-232 type interface. UART 260 may likewise couple to remote devices using a serial type interface such as RS-232. UART 258 and/or UART 260 may further couple to one or more remote devices using various other types of communication interfaces such as Bluetooth, IEEE 802.11a/b/g/n, and so on. In one or more embodiments, RS 232 driver 262 may couple to a stereo jack such as a one-eighth inch stereo jack to couple scanner system 100 to one or more other devices during operation of scanner system 100, for example to implement a tethered mode of operation. In one or more embodiments, UART 260 may couple to a remote device or computer for performing debugging or the like type operations for scanner system 100. However, these are merely example types of communication systems and/or interfaces for scanner system 100, and the scope of the claimed subject matter is not limited in these respects.

In one or more embodiments, power management block 120 of scanner system 100 may include a power source such as battery 264, which may optionally include a serially connected fuse 266, to provide an operational voltage for scanner system 100. The battery voltage ($V_{BATTERY}$) of battery 264 may be provided to voltage regulator 268 to provide a regulated operational voltage to scanner system 100. One or more power switches 270 may be coupled to voltage regulator 268 for powering scanner system 100 on or off. Power switches 270 may provide a first voltage level ($V_{ANALOG}$) to power analog devices of scanner system 100 at an appropriate voltage for such analog circuits, and/or may provide a second voltage level ($V_{DIGITAL}$) to power digital devices of scanner system 100 at an appropriate voltage for such digital devices. The battery voltage from battery 264 may also be provided to an analog-to-digital converter (ADC) 274, which may comprise a 10 bit converter, to provide a voltage reference signal to processor 110 which may monitor the output voltage of battery 264, for example to indicate to the user that the charge on battery 264 is sufficient for operating scanner system 100, or to indicate to the user that the charge on battery 264 is low and should be recharged. Processor 110 may include a peripheral serial bus 276 to couple to an electrically erasable program read only memory (EEPROM) 272 capable of being utilized for storing data from one or more decoded targets for example in a batch mode, and/or for storing programs and/or data capable of being executed by processor 110, for example to control the operation of scanner system 100, although the scope of the claimed subject matter is not limited in these respects.

Figure 3:
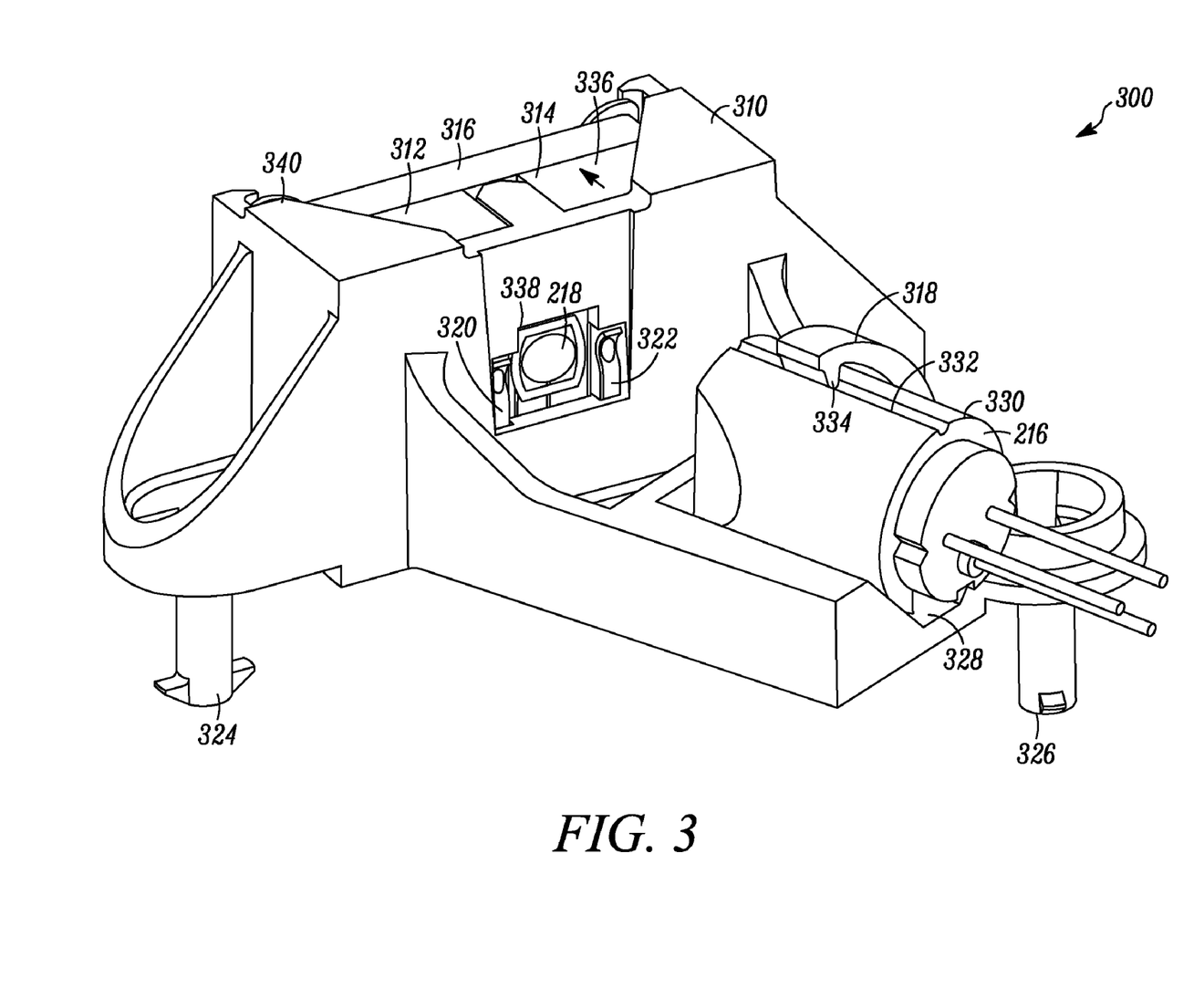
FIG. 3 is a perspective diagram of a scanning module of a scanner system in accordance with one or more embodiments.

Referring now to FIG. 3, a perspective diagram of a scanning module of a scanner system in accordance with one or more embodiments will be discussed. As shown in FIG. 3, scanning module 300 may comprise a frame 310 into which various components of scan line generator 112 may be disposed. In one or more embodiments, frame 310 may comprise a unitary structure comprising a molded plastic or the like. Frame 310 may comprise a first section 328 into which laser 216 may be inserted and fastened in place via snap arm 318. Laser 216 may comprise a transistor outline (TO) can type device inserted into a cylindrical cover or housing 330 having a slot or groove 332 into which a tab 334 of snap arm 318 may fit to hold laser 216 in place within first section 328. First section 328 may be further sized and/or shaped to contain laser 216 and restrict the lateral and/or longitudinal movement of laser 216 within first section 328. Such an arrangement of laser 216 and/or first section 328 may function to allow ease of insertion and/or removal of laser 216 into first section 328 of frame 310, and further to provide physical alignment of laser 216 such that a laser beam emitted from laser 216 may impinge upon MEMS device 218. Likewise, frame 310 may include second section 336 into which MEMS device 218 may be disposed and held within a proper alignment in second section 336 so that the laser beam emitted from laser 216 may impinge upon MEMS device 218 through window 338 formed in frame 310. Second section 336 may have a size and/or shape to allow magnet 312 and magnet 314 to be placed adjacent to MEMS device 218 and to further receive field plate 316 adjacent to and coupled with magnets 312 and 314. In addition, spring clip 340 may provide a bias force against field plate 316 to further secure field plate 316, magnets 312 and 314, and MEMS device 218 within second section 336. Contacts 320 and 322 may couple to the coil of MEMS device 218 to provide electrical contact with the coil and one or more contacts on a circuit board (not shown) onto which scanning module 300 may be placed within a housing of scanner system 100. Contacts 320 and 322 may be physically biased against corresponding contacts on MEMS device 218 to maintain physical and electrical contact with MEMS device 218 so that a mirror driving signal may be provided to MEMS device 218.

Such an arrangement of first section 328 and/or second section 336 may facilitate assembly of the components of scanning module 300 into frame 310 such that the components of scanning module 300 may be easily inserted into frame 310 without requiring additional alignment of the components such as laser 216 and/or MEMS device 218 after placement into frame 310. The tolerances with which frame 310 is manufactured may be sufficient to allow such assembly of scanning module 300 without requiring additional physical and/or electrical alignment of either laser 216 and/or scanning module 218. Frame 310 may further comprise one or more posts 324 and 326 having corresponding structures such as tabs to allow scanning module 300 to be attached to the circuit board (not shown) of scanner system 100 in a position with respect to window 228 as shown in FIG. 1 to allow for a range of motion for the sweep of the laser beam out of window 228 and to allow the laser beam reflected off of target 230 to enter back into the housing of scanner system 100 through window 228 to be detected by optical detector 236, although the scope of the claimed subject matter is not limited in these respects. It should be noted that although scanning module 300 of FIG. 3 pertains to a MEMS based scanning module for scanner system 100, scanning module 300 may be adapted to a MEMS based display module having a MEMS scanning rasterizer for generating a display from the laser light emitted from one or more lasers in a suitable arrangement to display an image projected onto a surface, in a display region such as in a head up display, and/or as an image projected onto a retina of a user, as a few of several examples, and the scope of the claimed subject matter is not limited in these respects.

Figure 4:
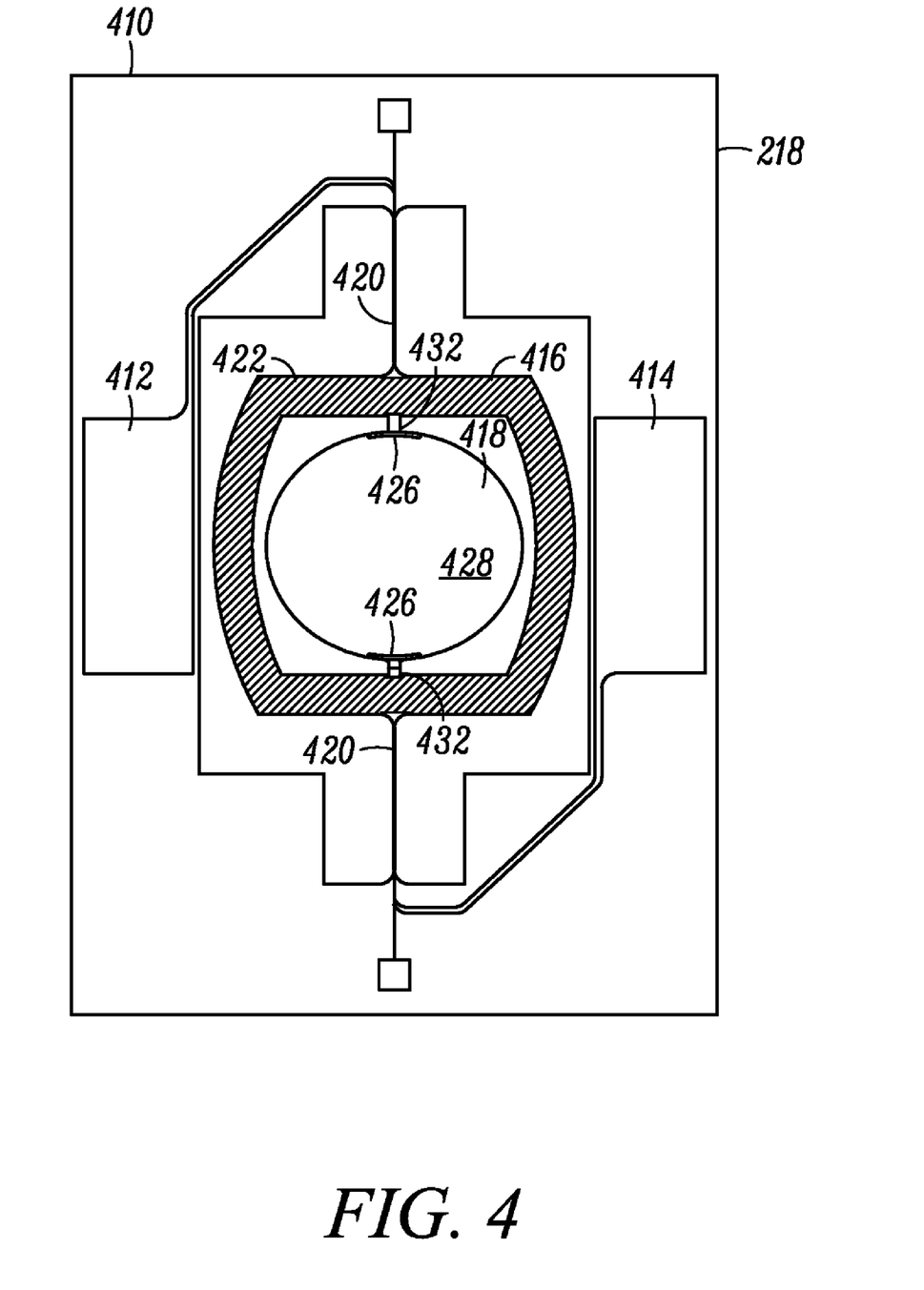
FIG. 4 is a top plan view of a MEMS device having a mirror for a scanner system in accordance with one or more embodiments.

Referring now to FIG. 4, a top plan view of a MEMS device having a mirror for a scanner system in accordance with one or more embodiments will be discussed. As shown in FIG. 4, MEMS device 218 may comprise a silicon frame 410 from which structures of MEMS device 218 may be formed, for example via etching and/or photolithography to produced the desired structures. In one or more embodiments, frame 410 may comprise a unitary structure including contacts 412 and 414 that comprise the ends of a coil 422 disposed on coil frame 416. Coil frame 416 may be supported by suspension arms 420 disposed at opposing ends of coil frame 416 along an axis of rotation of coil frame 416. Suspension arms 420 may comprise a continuous structure that extends into the interior region of coil frame 416 to couple to mirror platform 418 via connection points 432. Thus, in one or more embodiments, frame 410, coil frame 416, suspension arms 420, connection points 432, and mirror platform 418 may comprise a single piece of silicon or similar material. In one or more embodiments, coil 422 may be formed on coil frame 416 for example via deposition of a metal with a higher conductivity such as gold, aluminum, or copper. In one embodiment, coil 422 may comprise gold, although the scope of the claimed subject matter is not limited in this respect. Contact 412 may comprise a first end of coil 422, and contact 414 may comprise a second end of coil 422. In one or more embodiments, a mirror 428 may be formed as a thing metal firm disposed on mirror platform 418 via deposition of a metal with higher optical reflectance properties, for example aluminum. Mirror 428 may be capable of reflecting a beam of laser light impinging on its surface in a direction controlled by movement of coil frame 416 and mirror platform 418 as discussed, below.

In one or more embodiments, coil 422 may be driven with a signal to cause coil frame 416 to move and/or oscillate in response to the signal in the presence of a magnetic field to generate electromotive force. The magnetic field may be provided by magnets 312 and 314 of FIG. 3 disposed adjacent to frame 410 as shown for example in FIG. 3. Since mirror platform 418 is coupled to coil frame 416 via connection points 432, mirror platform 418 moves along with coil frame 416. Magnet 312 may be disposed with its polarity aligned in a first direction normal to the plane of coil 422, and magnet 314 may be disposed with its polarity disposed in a second direction normal to the plane of coil 422 such that the polarity of magnet 312 is opposite to the polarity of magnet 314. Such an arrangement of coil 422 and magnets 312 and 314 causes coil frame 416 and mirror platform to rotate about an axis generally aligned with suspension arms 420. The rotation of suspension arms 420 imparts a twist in the structure of suspension arms 420 to accommodate the movement of coil frame 416 and mirror platform 418 along the axis generally aligned with suspension arms 420. In order to minimize warping of mirror 428 which may adversely affect the laser beam reflected off of mirror 428 and thereby interfere with the scanning of target 230, for example where such warping may be the result of residual stress between the metal file of mirror 428 and the silicon material of mirror platform 418, mirror platform 418 may be connected to coil frame 416 at connection points 432 that are disposed collinearly with suspension arms 420, which may be generally aligned with the axis of rotation of coil frame 416 and/or mirror platform 418. Such an arrangement may reduce warping of mirror 428 since coil frame 416 may be minimally warped as such locations corresponding where coil frame 416 couples to suspension arms 420. In order to isolate mirror platform 418 from the twist of suspension arms 420 and to maintain the planar flatness of mirror platform 418, one or more flexible members 426 may be disposed on mirror platform 418 adjacent to connection points 432. As suspension arms 420 in response to movement of coil frame 416 when coil 422 is driven with a driving signal in the presence of a magnetic field, flexible members 426 prevent and/or reduce such twist from being imparted to mirror platform 418, thereby maintaining the relative flatness of mirror platform 418 and mirror 428.

Figure 5:
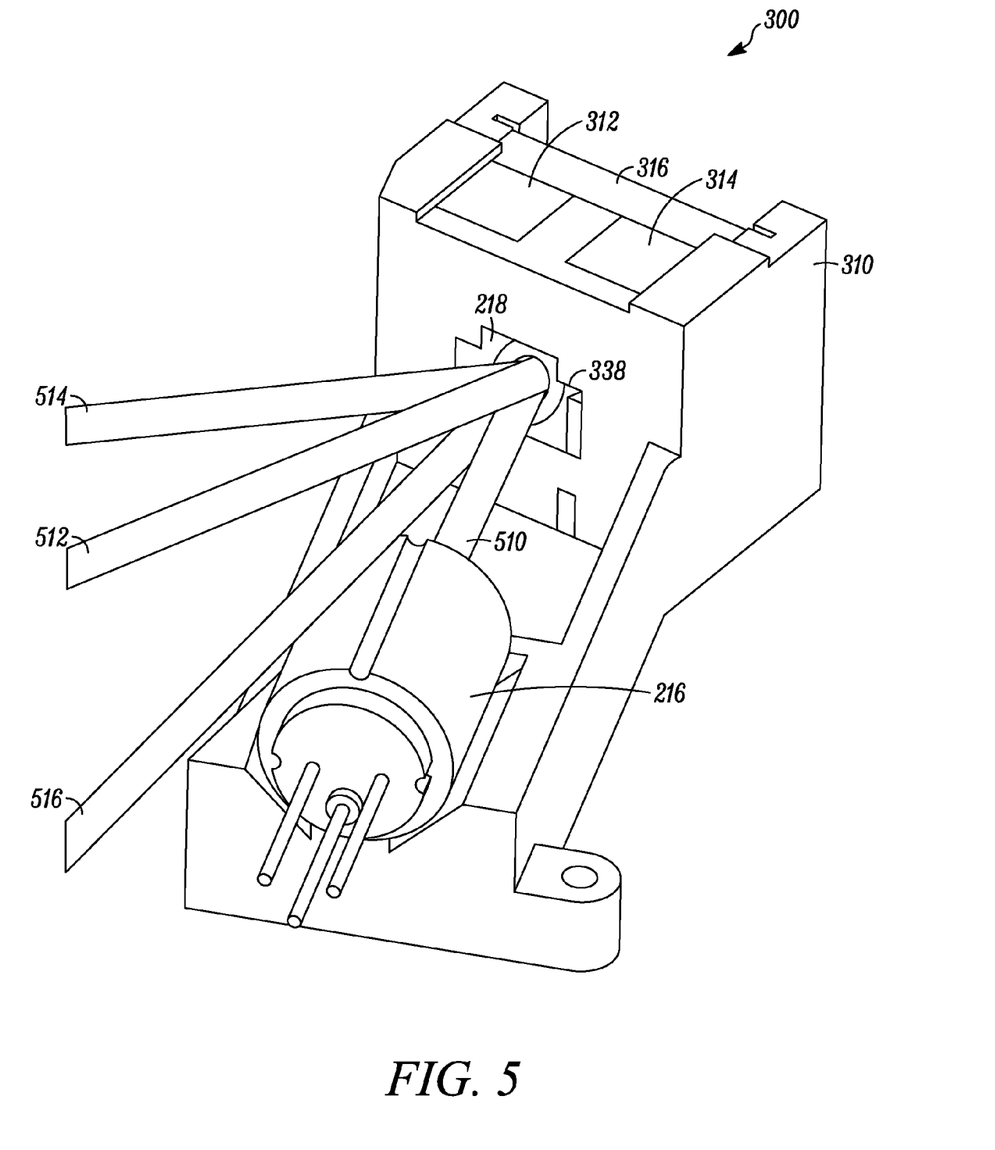
FIG. 5 is a perspective diagram of the scanning module of FIG. 3 further showing the scanning action of a reflected laser beam in accordance with one or more embodiments.

Referring now to FIG. 5, a perspective diagram of the scanning module of FIG. 3 further showing the scanning action of a reflected laser beam in accordance with one or more embodiments will be discussed. As shown in FIG. 5, MEMS device 218 of scanning module 300 may be driven to operate in a non-resonant mode. In one or more embodiments, laser 216 may emit a beam of laser light 510 that impinges upon the mirror 428 of MEMS device 218 to result in a reflected beam 512 that may be pointed in a direction based on the direction at which the mirror 428 of MEMS device 218 is pointed in response to a drive signal. A drive signal provided to MEMS device 218 may cause the reflected beam 512 to be swept between a first full deflection direction 514 to a second full deflection direction 516 to define a maximum field of view (FOV) at which MEMS device 218 may operate. In one embodiment, such a maximum field of view my comprise an angle between first direction 514 to second direction 516 of about 50 degrees, although the scope of the claimed subject matter is not limited in this respect.

By driving MEMS device 218 with in a mode that does not depend on the resonance of MEMS device 218, MEMS device 218 may be driven to oscillate at a desired frequency that may be a different frequency than the resonant frequency of MEMS device 218. For example, a typical MEMS device 218 may have a resonant frequency ranging from about 200 Hertz up to about 1000 Hertz. Thus, to operate such a MEMS device 218 in a resonant mode may require the drive signal and the beam sweep rate to be at or near the resonant frequency. Such a relatively higher rate of sweep may likewise require the target decoding electronics to operate at a faster rate than may be needed to actually decode the target. Thus, in one or more embodiments, MEMS device 218 may be non-resonantly driven at a frequency that is lower than the resonant frequency of MEMS device 218, while optionally being operated at a frequency that is sufficiently high such that any inadvertent hand movement of the user of scanning system 100 will not interfere and/or adversely affect the ability of scanning system 100 to successfully decode target codes. In one or more embodiments, MEMS device 218 may be non-resonantly driven at a frequency of about 50 Hertz, although the scope of the claimed subject matter is not limited in this respect.

In one or more embodiments, by driving MEMS device 218 in a non-resonant mode, the reflected beam 512 may be steered within a sweep range that includes any portion of a full sweep range between first direction 514 and second direction 516. In general, a sweep range may also refer to a sweep scan or a scan angle. Likewise, MEMS device 218 may be driven at a frequency that is capable of adapting to the size of target 230 and/or the size and/or spacing of the symbols of target 230, for example to slow down the rate of scanning if the symbols of target 230 are spaced more closely together, or to increase the rate of scanning if the symbols of target 230 are spaced more farther apart. Likewise, MEMS device 218 may be driven non-resonantly to direct the sweep range in a direction that may be off axis from the direction at which scanning system 100 is pointing, and/or to optimize the relative spot size of the beam reflected off of target 230 and impinging upon optical detector 236. Furthermore, in one or more embodiments, by driving MEMS device 218 in a non-resonant mode, the reflected beam 512 may be directed to a stationary position within the full sweep range including or between first direction 514 and second direction 516, for example to provide scanning system 100 with a function similar to a laser pointer. Details of such embodiments in which MEMS device 218 may be operated in a non-resonant mode are discussed further, below.

Figure 6:
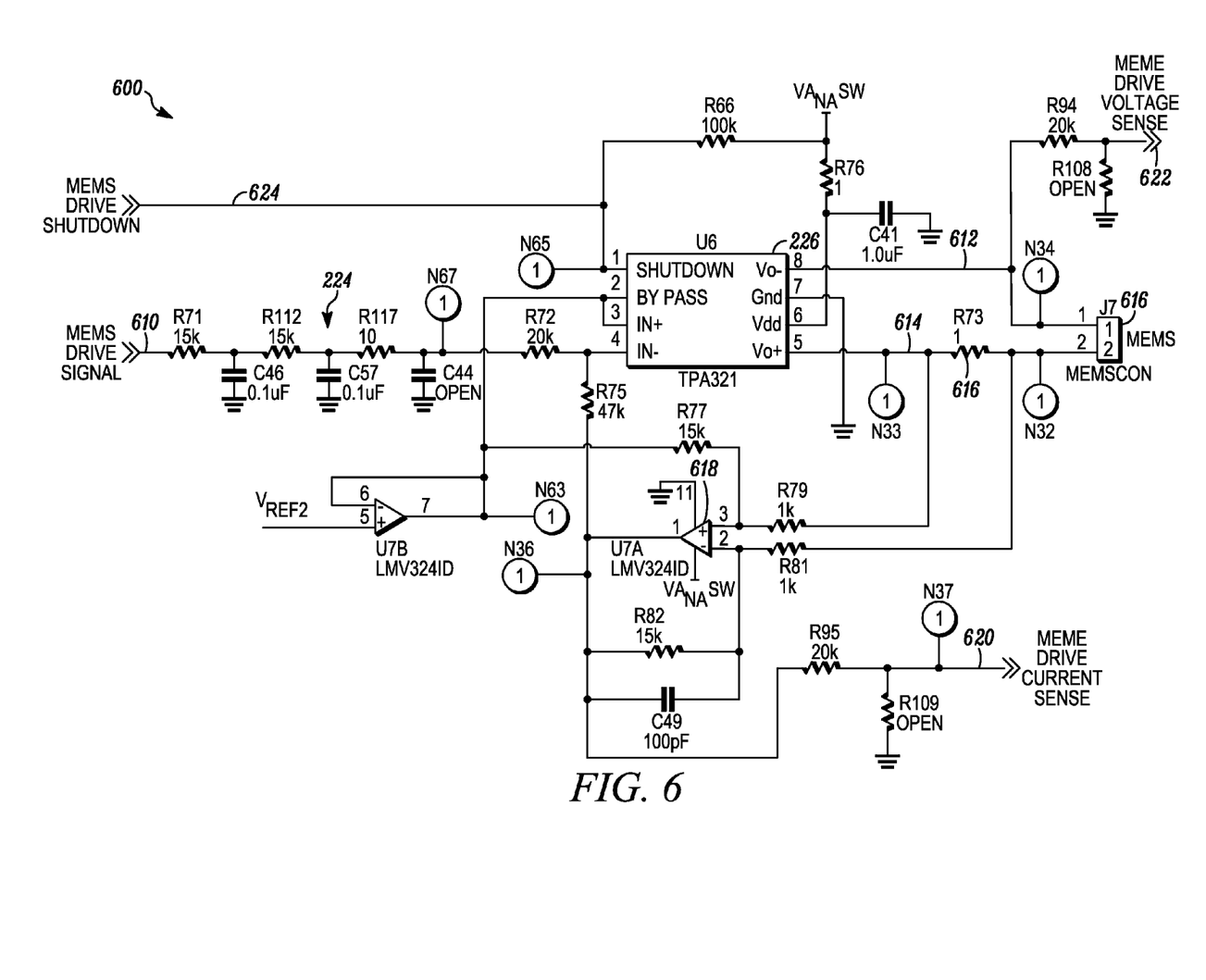
FIG. 6 is a diagram of a circuit capable of determining an operational state of a MEMS device of a scanner system in accordance with one or more embodiments.

Referring now to FIG. 6, a diagram of a circuit capable of determining an operational state of a MEMS device of a scanner system in accordance with one or more embodiments will be discussed. As shown in FIG. 6, circuit 600 is capable of providing power to MEMS device 218 via linear amplifier 226, which in one or more embodiments may comprise a TPA321 type amplifier. Processor 110 provides a drive signal 610 to linear amplifier 226 which may be first passed through filter 224 prior to drive signal 610 being provided to linear amplifier 226. Linear amplifier 226 then provides amplified drive signals 612 and 614 to MEMS device 218 that may be coupled to linear amplifier 226 via connector 616. In one or more embodiments, the voltage appearing at coil 422 may be detected at node N34 which may correspond to amplified drive signal 612. The voltage appearing at coil 422 may be fed back to processor 110 as a MEMS drive voltage sense signal 622, which may be optionally scaled by a voltage divider, to allow processor 110 to determine whether coil 422 is in an open circuit condition or a short circuit condition, or is otherwise operating in a possibly unsafe mode, as discussed in further detail below. Likewise, a current sense resistor 616 coupled in series with coil 422 may be utilized to determine a current flowing through coil 422 to determine whether coil 422 is in an open circuit condition or a short circuit condition. The value of the current flowing through current sense resistor 616 may be converted to a voltage signal via operational amplifier 618 where the voltage output by operational amplifier 618 may be proportional to the current flowing through current sense resistor 616. The voltage drop across current sense resistor 616 is amplified by operational amplifier 618 and summed into a low impedance summing junction at the inverting input of linear amplifier 226 to establish a feedback for example to operate linear amplifier 226 in a negative feedback mode of operation such that the current flowing through the MEMS coil is proportional to the MEMS_DRIVE_SIGNAL 610. The output voltage of operational amplifier 618 may also be provided to processor 110 as a MEMS drive current sense signal 620, which may be optionally scaled by a voltage divider when represented as a voltage signal proportional to the current signal, to allow processor 110 to determine whether coil 422 is in an open circuit condition or a short circuit condition, or is otherwise operating in a possibly unsafe mode, as discussed in further detail below. In the event that processor 110 determines that MEMS device 218 is operating in a possibly unsafe mode, processor 110 may send a MEMS drive shutdown signal 624 to linear amplifier 226 to cause power to MEMS device 218 to be shut down. Likewise, laser 216 may also be shut down by turning off power to constant power laser drive 214 to turn off the laser beam emitted by laser 216. However, these are merely example responses to the detection of MEMS device 218 operating in a possibly unsafe mode, and the scope of the claimed subject matter is not limited in these respects.

Figure 7A:
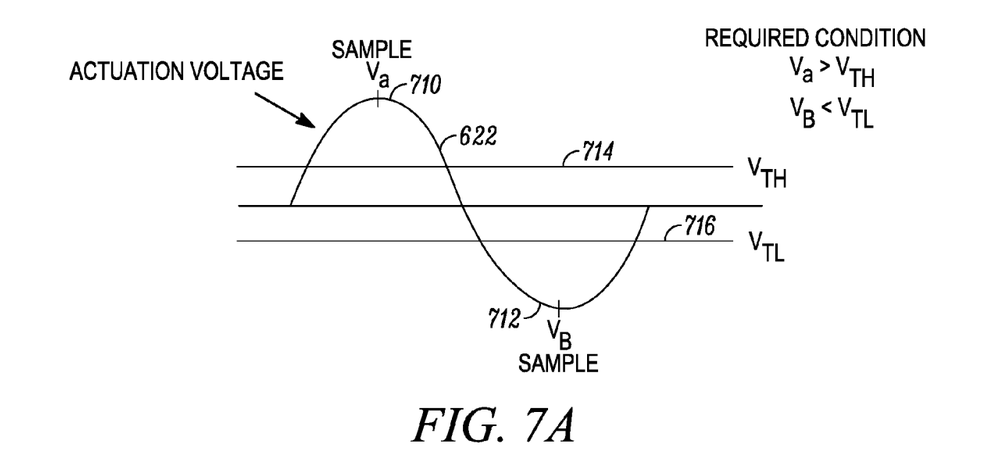
FIG. 7A and FIG. 7B are diagrams of voltage and current signals, respectively indicative of an operational state of a MEMS device of a scanner system in accordance with one or more embodiments.
Figure 7B:
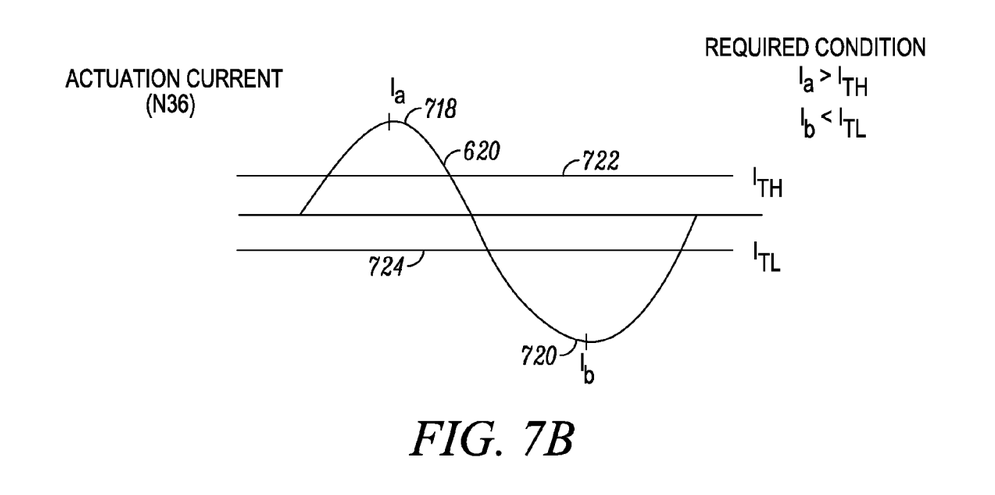

Referring now to FIG. 7A and FIG. 7B, diagrams of voltage and current signals, respectively, indicative of an operational state of a MEMS device of a scanner system in accordance with one or more embodiments will be discussed. In one or more embodiments, processor 110 may receive MEMS drive voltage sense signal 622 and/or MEMS drive current sense signal 620 from circuit 600 of FIG. 6, which may be sampled and converted into a digital format for processing by processor 110. As shown in FIG. 7A, MEMS drive voltage sense signal 622 may be represented by the waveform shown, which is represented in analog format in FIG. 7A and referred to as the actuation voltage for coil 422 of MEMS device 218. In general, MEMS drive voltage sense signal 622 may be sampled by processor 110 at the peaks of the waveform, for example sampled peak voltage ($V_a$) 710 may correspond to a voltage value at or near a positive peak of MEMS drive voltage sense signal 622, and sampled peak voltage ($V_B$) 712 may correspond to a voltage at or near a negative peak of MEMS drive voltage sense signal 622. In one or more embodiments, processor 110 may determine that coil 422 of MEMS device 218 is operating normally so long as the sampled peak voltage 710 is greater than a high threshold voltage ($V_{TH}$) 714, and the sampled peak voltage 712 is less than a low threshold voltage ($V_{TL}$) 716. In the event that either condition is not met, that is if sampled peak voltage 710 is not greater than the high threshold voltage 714, or if sampled peak voltage 712 is not less than the low threshold voltage 716, such a situation may be indicative of a short circuit condition for coil 422 of MEMS device 218. Under such circumstances, processor 110 may turn off power to MEMS device 218 and/or laser 216 to prevent scanner system 100 from operating in a possible unsafe mode.

Likewise, as shown in FIG. 7B, MEMS drive current sense signal 620 may be represented by the waveform shown, which is represented in analog format in FIG. 7B and referred to as the actuation current for coil 422 of MEMS device 218. In general, MEMS drive current sense signal 620 may be sampled by processor 110 at the peaks of the waveform, for example sampled peak current ($I_a$) 718 may correspond to a current value at or near a positive peak of MEMS drive current sense signal 620, and sampled peak current ($I_B$) 720 may correspond to a current at or near a negative peak of MEMS drive current sense signal 620. In one or more embodiments, processor 110 may determine that coil 422 of MEMS device 218 is operating normally so long as the sampled peak current 718 is greater than a high threshold current ($I_{TH}$) 722, and the sampled peak current 720 is less than a low threshold current ($I_{TL}$) 724. In the event that either condition is not met, that is if sampled peak current 718 is not greater than the high threshold current 722, or if sampled peak current 720 is not less than the low threshold current 724, such a situation may be indicative of an open circuit condition for coil 422 of MEMS device 218. Under such circumstances, processor 110 may turn off power to MEMS device 218 and/or laser 216 to prevent scanner system 100 from operating in a possible unsafe mode.

Figure 8:
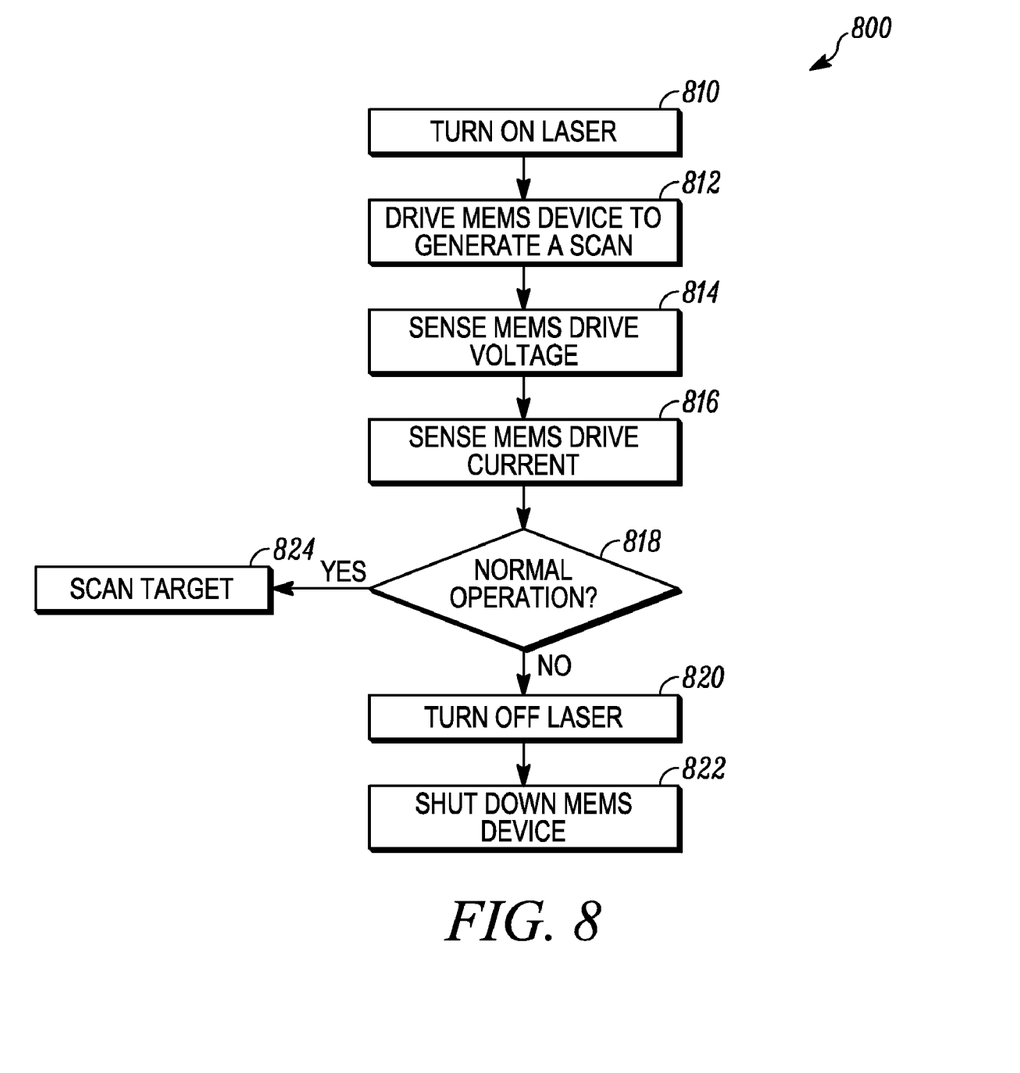
FIG. 8 is a flow diagram of a method for determining an operational state of a MEMS device of a scanner system in accordance with one or more embodiments.

Referring now to FIG. 8, a flow diagram of a method for detecting an operational station of a MEMS device of a scanner system will be discussed. FIG. 8 shows one particular order of blocks 810 through 824 for method 800, however other orders may also be utilized, with more or fewer blocks than shown in FIG. 8, and the scope of the claimed subject matter is not limited in these respects. In one or more embodiments, to begin operation of scanner system 100, laser 216 may be turned on at block 810, and MEMS device 218 may be driven at block 812 with MEMS drive signal 610, for example to generate a scan of target 230. Circuit 600 may obtain MEMS drive voltage sense signal 622 at block 814, and/or may obtain MEMS drive current sense signal 620 at block 816. Circuit 600 may provide MEMS drive voltage sense signal 622 and/or MEMS drive current sense signal 620 to processor 110 so that processor 110 may determine whether MEMS device 218 is operating normally at decision block 818. In the event that a determination is made that MEMS device 218 is not operating normally, for example if MEMS drive voltage sense signal 622 and/or MEMS drive current sense signal 620 are not at the proper values with respect to the predetermined threshold values, laser 216 may be turned off at block 820, and/or MEMS device 218 may be shut down at block 822. Otherwise, if MEMS device 218 is determined to be operating normally, scanner system 100 may continue normal operations, for example to scan a target 230 at block 824. However, this is merely one example method 800 for determining an operational state of MEMS device 218, and the scope of the claimed subject matter is not limited in this respect.

Figure 9:
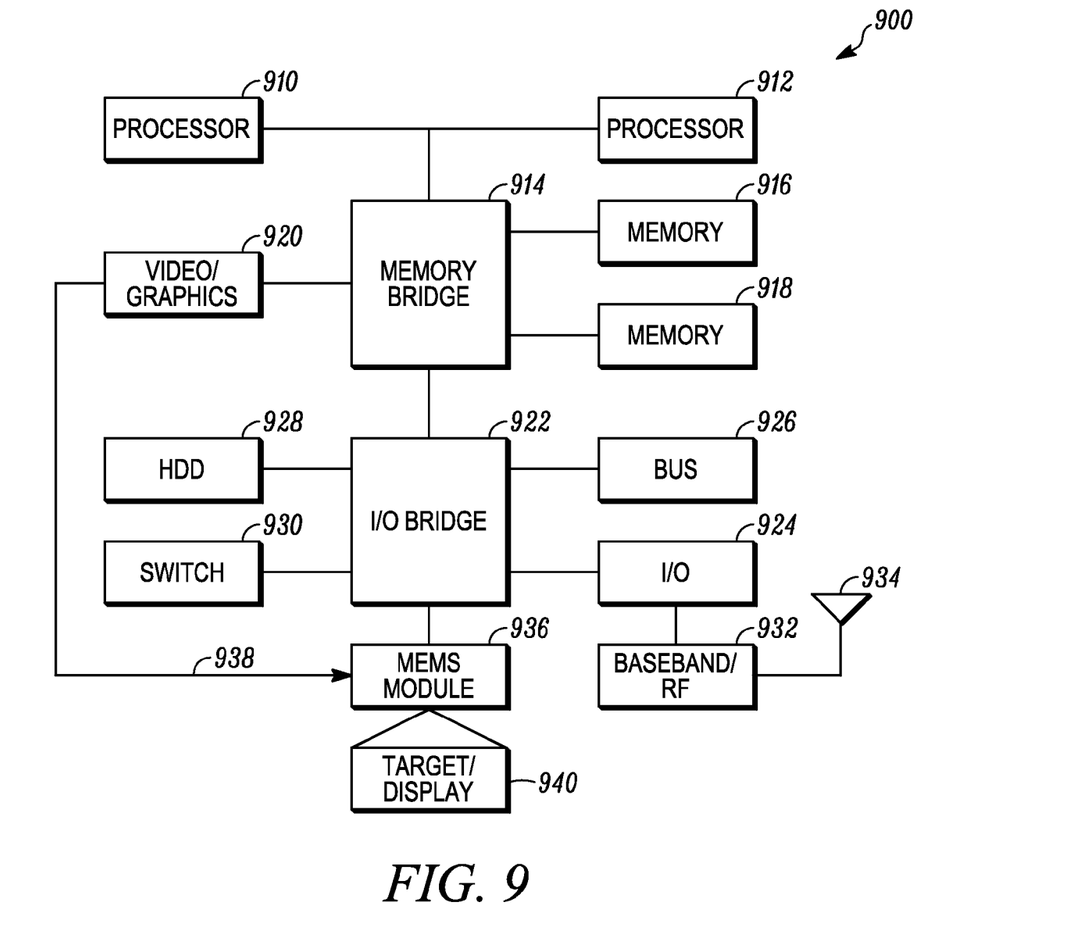
FIG. 9 is a block diagram of an information handling system capable of determining an operational state of a MEMS device of a scanner system in accordance with one or more embodiments.

Referring now to FIG. 9, a block diagram of an information handling system capable of determining an operational state of a MEMS device of a scanner system in accordance with one or more embodiments will be discussed. Information handling system 900 of FIG. 9 may tangibly embody scanner system 100 as shown in and described with respect to FIG. 1. Although information handling system 900 represents one example of several types of computing platforms, information handling system 900 may include more or fewer elements and/or different arrangements of elements than shown in FIG. 9, and the scope of the claimed subject matter is not limited in these respects.

Information handling system 900 may comprise one or more processors such as processor 910 and/or processor 912, which may comprise one or more processing cores. One or more of processor 910 and/or processor 912 may couple to one or more memories 916 and/or 918 via memory bridge 914, which may be disposed external to processors 910 and/or 912, or alternatively at least partially disposed within one or more of processors 910 and/or 912. Memory 916 and/or memory 918 may comprise various types of semiconductor based memory, for example volatile type memory and/or non-volatile type memory. Memory bridge 914 may couple to a video/graphics system 920 to drive a display device, which may comprise MEMS module 936, coupled to information handling system 900.

Information handling system 900 may further comprise input/output (I/O) bridge 922 to couple to various types of I/O systems. I/O system 924 may comprise, for example, a universal serial bus (USB) type system, an IEEE 1394 type system, or the like, to couple one or more peripheral devices to information handling system 900. Bus system 926 may comprise one or more bus systems such as a peripheral component interconnect (PCI) express type bus or the like, to connect one or more peripheral devices to information handling system 900. A hard disk drive (HDD) controller system 928 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 930 may be utilized to couple one or more switched devices to I/O bridge 922, for example Gigabit Ethernet type devices or the like. Furthermore, as shown in FIG. 9, information handling system 900 may include a baseband and radio-frequency (RF) block 932 comprising a base band processor and/or RF circuits and devices for wireless communication with other wireless communication devices and/or via wireless networks via antenna 934, although the scope of the claimed subject matter is not limited in these respects.

In one or more embodiments, information handling system 900 may include a MEMS module 936 that may correspond to scanning module 300 of FIG. 3 and which may include any one or more components of scanner system 100 such as processor 110, scan line generator 112, target bar code imager 114, user interface 116, communications/connectivity block 118, and/or power management block 120. In one or more embodiments, MEMS module 936 may be controlled by one or more of processors 910 and/or 912 to implements some or all of the functions of processor 110 of FIG. 1. MEMS module 936 may include MEMS device 218 as shown in and described with respect to FIG. 2 through FIG. 5, for example, and the state of operation of MEMS device 218 may be determined as shown in and described with respect to FIG. 6 through FIG. 8. In one or more embodiments, MEMS module 936 may comprise a scanner for scanning target 230 such as a bar code represented by target/display 940, and/or may comprise a MEMS based display for displaying an image projected by MEMS module 936 where the image may likewise be represented by target/display 940. In one or more embodiments, a scanned beam display engine may comprise video/graphics block 920 having a video controller to provide video information 938 to MEMS module 936 to display an image represented by target/display 940. In one or more embodiments, such a MEMS module 936 may include MEMS device 218 as described herein. In particular embodiments, MEMS device 218 may comprise a biaxial mirror system wherein mirror 428 may reflect a beam from laser 216 in two dimensions to generate a two-dimensional image. However, these are merely example implementations for MEMS module 936 within information handling system 900, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to determining an operational state of a MEMS based laser scanner and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodi-

What is claimed is:

1. An apparatus, comprising:
a laser to emit a beam of light;
a MEMS device having a mirror to reflect the beam of light emitted by the laser;
a scan line generator circuit to provide a drive signal to the MEMS device to move the mirror and direct the reflected beam of light in a motion responsive to the drive signal to project an image; and
a circuit to obtain an operational state of the MEMS device;
wherein the laser beam is turned off or the MEMS device is shut down, or combinations thereof, if the circuit obtains an operational state of the MEMS device indicative that the MEMS device is operating in a possibly unsafe mode of operation.

2. The apparatus as claimed in claim 1, the operational state being based at least in part on a MEMS drive voltage sense signal.

3. The apparatus as claimed in claim 1, the operational state being based at least in part on a MEMS drive current sense signal.

4. The apparatus as claimed in claim 1, the operational state being based at least in part on a MEMS drive voltage sense signal and being indicative of a short circuit in the MEMS device if a positive peak of the MEMS drive voltage sense signal is less than high threshold value, or if a negative peak of the MEMS drive voltage sense signal is greater than a low threshold value, or combinations thereof.

5. The apparatus as claimed in claim 1, the operational state being based at least in part on a MEMS drive current sense signal and being indicative of an open circuit in the MEMS device if a positive peak of the MEMS drive current sense signal is less than high threshold value, or if a negative peak of the MEMS drive current sense signal is greater than a low threshold value, or combinations thereof.

6. A scanned beam display, comprising:
a video controller; and
a MEMS module capable of being controlled by said video controller to project an image, said MEMS module comprising:
a laser to emit a beam of light;
a MEMS device having a mirror to reflect the beam of light emitted by the laser;
a scan line generator circuit to provide a drive signal to the MEMS device to move the mirror and direct the reflected beam of light in a motion responsive to the drive signal to project the image; and
a circuit to obtain an operational state of the MEMS device;
wherein the laser beam is turned off or the MEMS device is shut down, or combinations thereof, if the circuit obtains an operational state of the MEMS device indicative that the MEMS device is operating in a possibly unsafe mode of operation.

7. The scanned beam display as claimed in claim 6, the operational state being based at least in part on a MEMS drive voltage sense signal.

8. The scanned beam display as claimed in claim 6, the operational state being based at least in part on a MEMS drive current sense signal.

9. The scanned beam display as claimed in claim 6, the operational state being based at least in part on a MEMS drive voltage sense signal and being indicative of a short circuit in the MEMS device if a positive peak of the MEMS drive voltage sense signal is less than high threshold value, or if a negative peak of the MEMS drive voltage sense signal is greater than a low threshold value, or combinations thereof.

10. The scanned beam display as claimed in claim 6, the operational state being based at least in part on a MEMS drive current sense signal and being indicative of an open circuit in the MEMS device if a positive peak of the MEMS drive current sense signal is less than high threshold value, or if a negative peak of the MEMS drive current sense signal is greater than a low threshold value, or combinations thereof.

11. A display system, comprising:
a processor;
a memory coupled to said processor; and
a MEMS module capable of being controlled by said processor by a program stored in the memory, said MEMS module comprising:
a laser to emit a beam of light;
a MEMS device having a mirror to reflect the beam of light emitted by the laser;
a scan line generator circuit to provide a drive signal to the MEMS device to move the mirror and direct the reflected beam of light in a motion responsive to the drive signal to project an image; and
a circuit to obtain an operational state of the MEMS device;
wherein the laser beam is turned off or the MEMS device is shut down, or combinations thereof, if the circuit obtains an operational state of the MEMS device indicative that the MEMS device is operating in a possibly unsafe mode of operation.

12. The display system as claimed in claim 11, the operational state being based at least in part on a MEMS drive voltage sense signal.

13. The display system as claimed in claim 11, the operational state being based at least in part on a MEMS drive current sense signal.

14. The display system as claimed in claim 11, the operational state being based at least in part on a MEMS drive voltage sense signal and being indicative of a short circuit in the MEMS device if a positive peak of the MEMS drive voltage sense signal is less than high threshold value, or if a negative peak of the MEMS drive voltage sense signal is greater than a low threshold value, or combinations thereof.

15. The display system as claimed in claim 11, the operational state being based at least in part on a MEMS drive current sense signal and being indicative of an open circuit in the MEMS device if a positive peak of the MEMS drive current sense signal is less than high threshold value, or if a negative peak of the MEMS drive current sense signal is greater than a low threshold value, or combinations thereof.

16. A method, comprising:
powering a laser to emit a beam of light;
driving a MEMS device having a mirror to reflect the beam of light emitted by the laser, to move the mirror and direct the reflected beam of light in a motion responsive to the drive signal to project an image;
obtaining an operational state of the MEMS device; and
turning off the laser beam or shutting down the MEMS device, or combinations thereof, if the operational state of the MEMS device is indicative that the MEMS device is operating in a possibly unsafe mode of operation.

17. The method as claimed in claim 16, said obtaining the operational state comprising obtaining a MEMS drive voltage sense signal.

18. The method as claimed in claim 16, said obtaining the operational state comprising obtaining a MEMS drive current sense signal.

19. The method as claimed in claim 16, said obtaining the operational state comprising obtaining a MEMS drive voltage sense signal, the operational state being indicative of a short circuit in the MEMS device if a positive peak of the MEMS drive voltage sense signal is less than high threshold value, or if a negative peak of the MEMS drive voltage sense signal is greater than a low threshold value, or combinations thereof.

20. The method as claimed in claim 16, said obtaining the operational state comprising obtaining a MEMS drive current sense signal being indicative of an open circuit in the MEMS device if a positive peak of the MEMS drive current sense signal is less than high threshold value, or if a negative peak of the MEMS drive current sense signal is greater than a low threshold value, or combinations thereof.

\* \* \* \* \*